US010088975B2

(12) United States Patent
Goertz

(10) Patent No.: US 10,088,975 B2
(45) Date of Patent: Oct. 2, 2018

(54) USER INTERFACE

(71) Applicant: Neonode Inc., Santa Clara, CA (US)

(72) Inventor: Magnus Goertz, Lidingo (SE)

(73) Assignee: Neonode Inc., San Jose, CA (US)

(*) Notice: Subject to any disclaimer, the term of this patent is extended or adjusted under 35 U.S.C. 154(b) by 421 days.

(21) Appl. No.: 14/324,166

(22) Filed: Jul. 5, 2014

(65) Prior Publication Data

US 2014/0325441 A1    Oct. 30, 2014

Related U.S. Application Data

(63) Continuation of application No. 13/310,755, filed on Dec. 4, 2011, now Pat. No. 8,812,993, which is a continuation of application No. 10/315,250, filed on Dec. 10, 2002, now Pat. No. 8,095,879.

(51) Int. Cl.
G06F 3/048    (2013.01)
G06F 3/0482    (2013.01)
G06F 3/0481    (2013.01)
G06F 3/0488    (2013.01)
G06F 3/01    (2006.01)
G06F 3/0484    (2013.01)

(52) U.S. Cl.
CPC .......... *G06F 3/0482* (2013.01); *G06F 3/017* (2013.01); *G06F 3/0481* (2013.01); *G06F 3/0488* (2013.01); *G06F 3/04817* (2013.01); *G06F 3/04842* (2013.01)

(58) Field of Classification Search
CPC .................................................. G06F 3/0482
See application file for complete search history.

(56) References Cited

U.S. PATENT DOCUMENTS

| 5,053,758 | A | * | 10/1991 | Cornett | G06F 3/0488 341/33 |
| 5,054,774 | A | * | 10/1991 | Belsito | A63B 24/00 345/173 |
| 5,119,079 | A | * | 6/1992 | Hube | G03G 15/5016 345/173 |
| 5,398,045 | A | * | 3/1995 | Sach | G06F 3/0488 340/945 |
| 5,581,681 | A | | 12/1996 | Tchao et al. | |
| 5,603,053 | A | * | 2/1997 | Gough | G06F 3/0481 345/156 |

(Continued)

OTHER PUBLICATIONS

U.S. Appl. No. 60/365,160, Limited Page Device Page Scrolling, filed Mar. 19, 2002.

(Continued)

*Primary Examiner* — Ryan F Pitaro
(74) *Attorney, Agent, or Firm* — Soquel Group LLC

(57) ABSTRACT

A non-transitory computer readable medium storing instructions which, when executed by a processor of an electronic device having a touch-sensitive display, cause the processor to enable a user interface of the device, including presenting a list of items on the display, each item having content associated therewith, highlighting an item in the list by presenting a highlight marking on that item, translating the highlight marking within the list, in response to an object gliding along the display, and opening the content associated with the currently highlighted item, in response to a tap gesture on the display.

19 Claims, 4 Drawing Sheets

(56) References Cited

U.S. PATENT DOCUMENTS

| | | | |
|---|---|---|---|
| 5,677,708 A | 10/1997 | Matthews, III et al. | |
| 5,757,368 A | 5/1998 | Gerpheide et al. | |
| 5,821,930 A * | 10/1998 | Hansen | G06F 3/04883 345/173 |
| 5,900,875 A | 5/1999 | Haitani et al. | |
| 5,905,497 A * | 5/1999 | Vaughan | G06F 3/0482 345/157 |
| 6,208,340 B1 * | 3/2001 | Amin | G06F 1/1626 715/808 |
| 6,323,846 B1 | 11/2001 | Westerman et al. | |
| 6,366,302 B1 * | 4/2002 | Crosby | H04M 1/274525 715/783 |
| 6,384,850 B1 | 5/2002 | McNally et al. | |
| 6,448,985 B1 | 9/2002 | McNally | |
| 6,639,584 B1 | 10/2003 | Li | |
| 6,690,365 B2 * | 2/2004 | Hinckley | G06F 3/03547 345/173 |
| 6,690,387 B2 | 2/2004 | Zimmerman et al. | |
| 6,707,449 B2 | 3/2004 | Hinckley et al. | |
| 6,727,916 B1 * | 4/2004 | Ballard | G06Q 10/107 715/758 |
| 6,727,917 B1 | 4/2004 | Chew et al. | |
| 6,734,883 B1 | 5/2004 | Wynn et al. | |
| 6,781,575 B1 * | 8/2004 | Hawkins | H04M 1/27455 345/169 |
| 6,788,292 B1 * | 9/2004 | Nako | G06F 1/1616 345/173 |
| 6,957,397 B1 * | 10/2005 | Hawkins | G06F 3/0482 715/810 |
| 6,977,645 B2 * | 12/2005 | Brosnan | G06F 1/1626 345/157 |
| 6,982,733 B1 | 1/2006 | McNally et al. | |
| 7,007,239 B1 | 2/2006 | Hawkins et al. | |
| 7,239,227 B1 | 7/2007 | Gupta et al. | |
| 7,333,951 B1 * | 2/2008 | Corning | G06Q 20/108 455/466 |
| 7,353,461 B2 * | 4/2008 | Davidsson | G06F 3/04886 715/765 |
| 7,818,691 B2 | 10/2010 | Irvine | |
| 2001/0043189 A1 * | 11/2001 | Brisebois | G06F 3/03547 345/156 |
| 2002/0015064 A1 | 2/2002 | Robotham et al. | |
| 2002/0026483 A1 * | 2/2002 | Isaacs | H04L 51/04 709/206 |
| 2002/0034281 A1 * | 3/2002 | Isaacs | H04L 51/04 379/88.12 |
| 2002/0046315 A1 * | 4/2002 | Miller | G06F 9/4443 711/1 |
| 2002/0060699 A1 * | 5/2002 | D'Agostini | G06F 1/1616 715/783 |
| 2003/0014239 A1 * | 1/2003 | Ichbiah | G06F 3/0233 704/7 |
| 2003/0043207 A1 * | 3/2003 | Duarte | G06F 3/0485 715/810 |
| 2003/0076306 A1 | 4/2003 | Zadesky et al. | |
| 2003/0122787 A1 | 7/2003 | Zimmerman et al. | |
| 2003/0122882 A1 * | 7/2003 | Kho | G06F 3/0482 715/864 |
| 2003/0179189 A1 | 9/2003 | Lira | |
| 2003/0179239 A1 | 9/2003 | Lira | |
| 2003/0182628 A1 | 9/2003 | Lira | |
| 2004/0046791 A1 * | 3/2004 | Davis | G06F 1/1626 715/762 |
| 2004/0100510 A1 | 5/2004 | Milic-Frayling et al. | |
| 2004/0233179 A1 | 11/2004 | Lira | |
| 2008/0036743 A1 * | 2/2008 | Westerman | G06F 3/038 345/173 |

OTHER PUBLICATIONS

U.S. Appl. No. 60/365,161, Control and Correction of Display Navigation, filed Mar. 19, 2002.

U.S. Appl. No. 60/365,197, Displaying Content on a Display in Column Format, filed Mar. 19, 2002.

U.S. Appl. No. 60/368,988, Animated Display, filed Apr. 2, 2002.

* cited by examiner

USER INTERFACE

PRIORITY REFERENCE TO RELATED APPLICATIONS

This application is a continuation of U.S. application Ser. No. 13/310,755, entitled USER INTERFACE, filed on Dec. 4, 2011 by inventor Magnus Goertz, which is a continuation of U.S. application Ser. No. 10/315,250, now U.S. Pat. No. 8,095,879, entitled USER INTERFACE FOR MOBILE HANDHELD COMPUTER UNIT, filed on Dec. 10, 2002 by inventor Magnus George Goertz.

TECHNICAL FIELD

The present invention relates to a user interface for a mobile handheld computer unit, which computer unit comprises a touch sensitive area, and which touch sensitive area is divided into a menu area and a display area.

The computer unit is adapted to run several applications simultaneously and to present any active application on top of any other application on the display area.

The present invention also relates to an enclosure for a handheld computer unit.

The present invention also relates to a computer readable medium. A computer program product with computer program code is stored within the computer readable medium, which code, when read by a computer, will make it possible for this computer to present a user interface according to the invention.

DESCRIPTION OF BACKGROUND ART

Mobile handheld computers are known in various embodiments. One kind of handheld computer is the personal digital assistant (PDA), which is getting more and more powerful.

Another kind of handheld computer unit is the mobile phone, which also is getting more and more powerful. There are also examples of where the mobile phone and the PDA are merging into one unit.

A third kind of handheld computer is the laptop computer, which is getting smaller and smaller, even competing in size with the PDAs.

The need to manage more information has led the development towards new solutions regarding user interfaces and navigation. The PDAs and mobile phones are getting larger and larger in order to provide a user-friendly interface.

Since the users have gotten used to small handheld units, it is hard to move towards larger units. This has led to foldable keyboards, different kinds of joysticks and different kinds of touch sensitive displays and pads intended to help in providing a user interface that is suitable for small handheld computer units.

SUMMARY OF THE PRESENT INVENTION

Technical Problems

It is a problem to provide a user-friendly interface that is adapted to handle large amounts of information and different kinds of traditional computer-related applications on a small handheld computer unit.

It is a problem to provide a user interface that is simple to use, even for inexperienced users of computers or handheld devices.

It is a problem to provide a small handheld computer unit with an easily accessible text input function.

It is also a problem to provide a simple way to make the most commonly used functions for navigation and management available in the environment of a small handheld computer unit.

Solution

Taking these problems into consideration, and with the starting point from a user interface for a mobile handheld computer unit, which computer unit comprises a touch sensitive area, which touch sensitive area is divided into a menu area and a display area, which computer unit is adapted to run several applications simultaneously and to present an active application on top of any other application on the display area, the present invention teaches that the menu area is adapted to present a representation of a first, a second and a third predefined function, where the first function is a general application dependent function, the second function is a keyboard function, and the third function is a task and file manager. The present invention also teaches that any one of these three functions can be activated when the touch sensitive area detects a movement of an object with its starting point within the representation of the function on the menu area and with a direction from the menu area to the display area.

With the purpose of providing a simple way of managing any application or the operating system, the present invention teaches that if the first function is activated, the display area is adapted to display icons representing services or settings, depending on the current active application. One of the icons always represents a "help service", regardless of application. The icons are adapted to represent services or settings of the operating system of said computer unit, such as background picture, clock, users, help, etc. if no application is currently active on the computer unit.

Selection of a preferred service or setting is done by tapping on a corresponding icon.

With the purpose of providing the access to a text input function in any application in the computer unit, the present invention teaches that when the second function is activated, the display area is adapted to display a keyboard and a text field.

If a text passage in an active application is highlighted, then this text passage is displayed in the text field for editing through the keyboard and that the highlighted text passage is replaced by the edited text passage when the second function is deactivated.

If no text passage in an active application is highlighted, then the text field is available for inputting and editing text through the keyboard.

In the case of the latter the first function can be activated, or the second function can be closed, in which case a choice of saving or deleting the inputted text is given. The choice of saving the inputted text results in an activation of the first function. In this case the first function will present services or settings available for the inputted text, such as saving the inputted text for later use, using the inputted text as a telephone number in a telephone application, or sending the inputted text as a message in a communications application.

In order to provide task and file management in a user interface for a handheld mobile computer, the present invention teaches that, if the third function is activated, the display area is adapted to display a list with a library of available applications and files on the computer unit. A selection of an application will start the application, and a selection of a file will open the file in an application intended for the file.

A selection of an application or a file is done by moving the object so that the representation of the desired application or file is highlighted, removing the object from the touch sensitive area, and then tapping on the touch sensitive area.

According to the present invention navigation in the list is performed by moving the object in a direction towards the top of the list or towards the bottom of the list. This will cause the marking to move in the same direction. The speed of the movement of the marking is lower than the speed of the movement of the object, with the purpose of making the navigation easier.

The user interface of the present invention is specifically adapted to be used with a small computer unit where the size of the touch sensitive area is in the order of 2-3 inches. The user interface is also adapted to be operated by one hand, where the object can be a finger, such as the thumb, of a user of the computer unit.

Advantages

Those advantages that can be primarily associated with a user interface or a computer readable medium according to the present invention reside in the ability to establish a user-friendly interface for small handheld computers, both regarding general application set-up functions, text input functions, and file and task management.

BRIEF DESCRIPTION OF THE DRAWINGS

The present invention will now be described in more detail with reference to the accompanying drawings, in which.

DESCRIPTION OF EMBODIMENTS AT PRESENT PREFERRED

Figure 1:
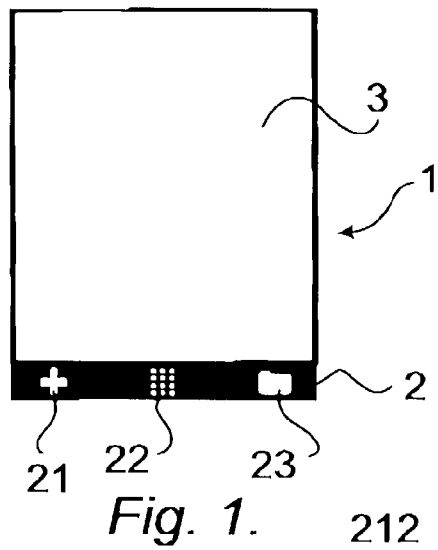
FIG. 1 is a schematic and highly simplified view of a touch sensitive area on a mobile handheld computer unit.

FIG. 1 illustrates a user interface for a mobile handheld computer unit. The user interface according to the present invention is specifically adapted to computer units comprising a touch sensitive area 1, which is divided into a menu area 2 and a display area 3. It should be understood that there are several different kinds of known touch sensitive displays and that the present invention does not depend on what kind of touch sensitive display that is used in relation to the inventive user interface.

The computer unit is adapted to run several applications simultaneously and to present an active application on top of any other application on the display area 3. It should be understood that by simultaneously it is meant any technology that will make it appear to a user of the computer unit that applications are run simultaneously and that the present invention does not depend on how this is realized, whether it is through time-sharing of one processor, parallel use of several processors, or any other technique.

According to the present invention the menu area 2 is adapted to present a representation of a first 21, a second 22 and a third 23 predefined function.

The first function 21 is a general application dependent function, the second function 22 is a keyboard function, and the third function 23 is a task and file manager.

Figure 2:
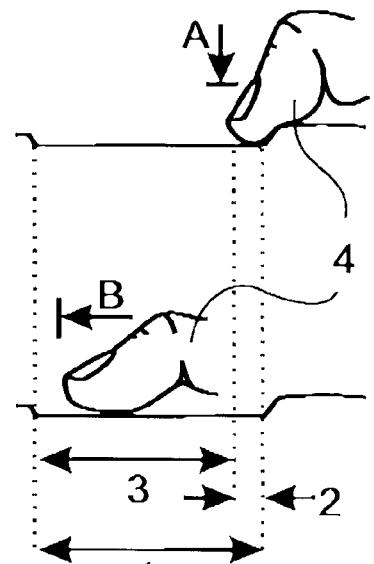
FIG. 2 is a schematic side view illustrating the activation of a function.

FIG. 2 shows that any one of these three functions 21, 22, 23 can be activated when the touch sensitive area 1 detects a movement of an object 4 with its starting point A within the representation of a function on the menu area 2 and with a direction B from the menu area 2 to the display area 3.

Figure 3:
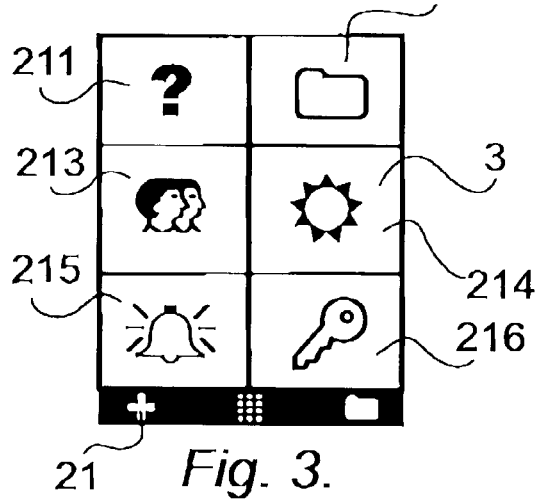
FIG. 3 is a schematic illustration of a first function.

FIG. 3 shows that if the first function 21 is activated, then the display area 3 is adapted to display icons 211, 212, 213, 214, 215, 216 representing services or functions depending on the current active application. One of the icons, in the figure exemplified by icon 211, always represents a "help service", regardless of application. Any key that, because of lack of space on the display area, or because the key should be hidden from the active application, or because of any other reason is not shown on the display area of an active application, can be represented by one of the icons 212, 213, 214, 215, 216 that is shown when the first function 21 is activated.

If for instance the active application handles a picture, then the icons that are shown when the first function is activated can be services such as "save to disk", "send as SMS", or "delete" and they can be settings such as "resolution", "color", or "brightness".

If no application is currently active on the computer unit, then the icons 211, 212, 213, 214, 215, 216 are adapted to represent services or settings of the operating system of the computer unit, such as background picture, clock, alarm 215, users 213, help 211, etc.

Figure 4:
FIG. 4 is a schematic side view illustrating the selection of a service or setting represented by an icon.
Figure 4:
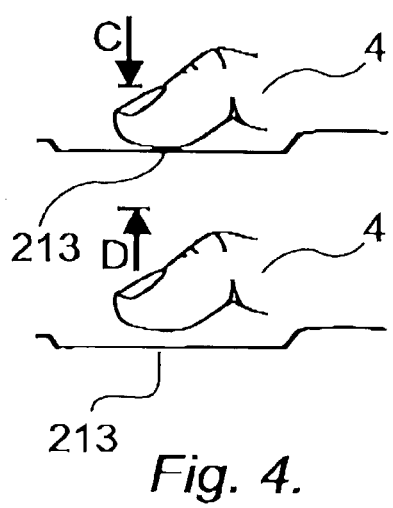

FIG. 4 shows that selection of a preferred service or setting is done by tapping C, D on corresponding icon 213.

Figure 5:
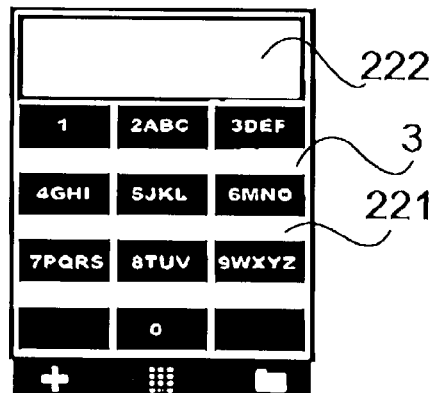
FIG. 5 is a schematic illustration of a second function.

FIG. 5 shows that if the second function 22 is activated, then the display area 3 is adapted to display a keyboard 221 and a text field 222.

Two different scenarios can be at hand when this function key is activated. A first scenario can be that a text passage in the active application is highlighted as the second function is activated. If this is the case then the highlighted text passage is displayed in the text field 222 for editing through the keyboard 221.

The highlighted text passage is replaced by the edited text passage when the second function 22 is deactivated.

A second scenario can be that no text passage in the active application is highlighted. If this is the case then the text field 222 is available for inputting and editing of text through the keyboard 221.

In the case of the latter scenario, the first function 21 can be activated, or the second function 22 can be closed. If the second function 22 is closed then a choice of saving or deleting the inputted text is given, where the choice of saving the inputted text results in an activation of the first function 21.

As the first function 21 is activated with the second function 22 as the currently active application the first function 21 will present services or settings available for the inputted text, such as saving the inputted text for later use, using the inputted text as a telephone number in a telephone application, or sending the inputted text as a message in a communications application, such as e-mail, SMS, or fax.

Figure 6:
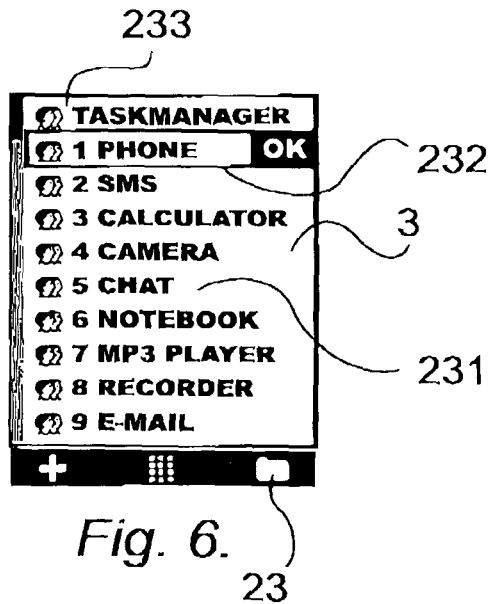
FIG. 6 is a schematic side view illustrating the selection of a third function.

FIG. 6 shows that if the third function 23 is activated, then the display area 3 is adapted to display a list 231 with a library of available applications and files on the computer unit.

A selection of an application will start the application, and a selection of a file will open the file in an application intended for the file. The name of a selected file can be edited by activation of the second function 22 as the file is highlighted.

Figure 7:
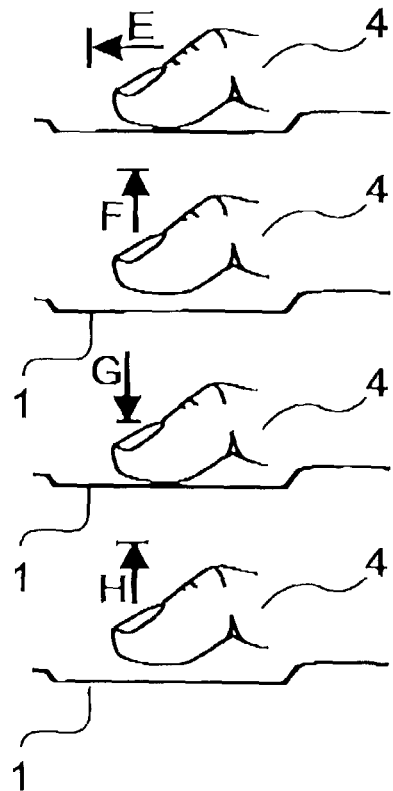
FIG. 7 is a schematic illustration of an application or file.

FIG. 7 shows that a selection of an application or a file is done by moving E the object 4 so that the representation of a desired application or file is highlighted, removing F the object 4 from the touch sensitive area 1, and then tapping G, H on the touch sensitive area 1.

An application or file is highlighted by placing some kind of marking 232 on the representation of the application or file. This marking can be done in different ways, for example by putting a frame around the representation of the application or file, as shown in the figure, or by inverting the representation of the application or file.

It should be understood that all lists in the computer unit, such as a list of contact information in an address book, a list of e-mail messages in a mailbox, or a telephone log, can be managed in the above described manner.

The list 231 can be adapted to present only files or only applications. In this case, the top area of the list 231 can present a field 233 through which the content of the list 231 can be altered. If the list only presents files, then the field 233 can display a representation of a task manager and a selection of the field 233 will cause the list 231 to alter to present only applications, and if the list 231 only presents applications, then the field 233 displays a representation of a file manager and a selection of the field 233 will cause the list 231 to alter and present only files.

Figure 8:
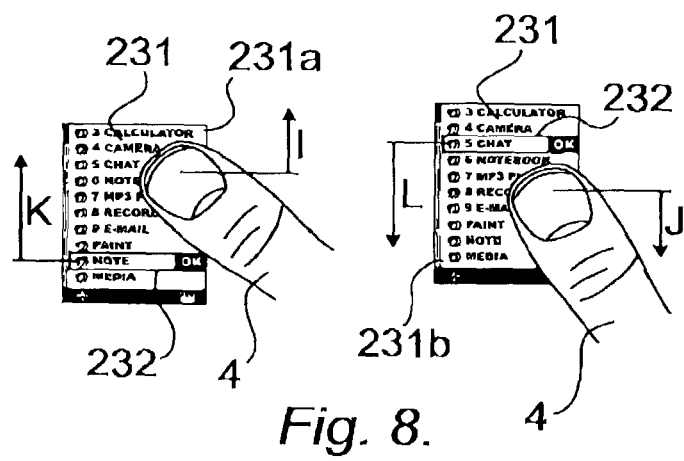
FIG. 8 is a schematic illustration of how navigation is performed.

FIG. 8 shows that navigation in the list is performed by moving the object 4 in a direction I towards the top 231*a* of the list 231 or towards J the bottom 231*b* of the list 231. This movement I, J of the object 4 will cause the marking 232 to move K, L in the same direction. The speed of the movement K, L of the marking 232 is lower than the speed of the movement I, J of the object 4.

Figure 9:
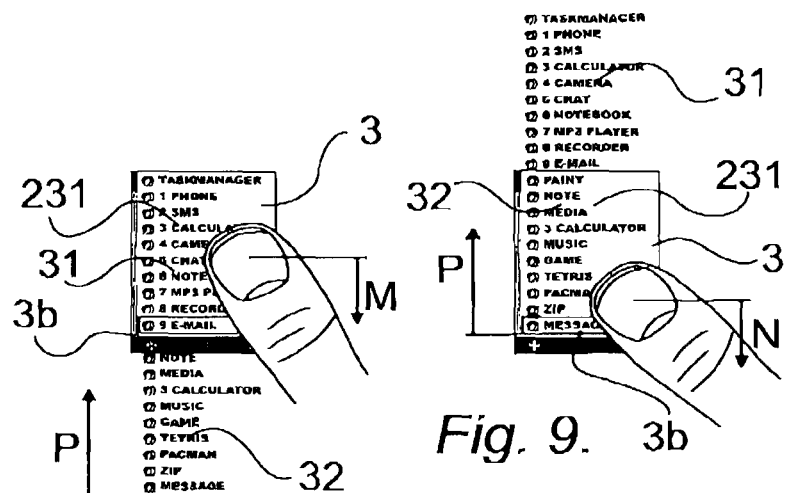
FIG. 9 is a schematic illustration of how the content of the display are is changed.

FIG. 9 shows that if the number of applications and/or files in the list 231 exceeds the number of applications and/or files that can be presented on the display area 3, and if the object 4 is moved to the top or bottom position of the display area, then lifted, replaced on the display area, and then again moved to the top or bottom of the display area, then the content of the display area will be replaced one whole page, meaning that if the object 4 is positioned N at the bottom 3*b* of the display area 3, then lifted, replaced on the display area 3, and then again moved M to the bottom 3*b* of the display area 3, then the content 31 of the display area 3 will be replaced P by the following applications and/or files 32 in the list 231. In the same way, but not shown in the figure, if the object is positioned at the top of the display area, then lifted, replaced on the display area 3, and then again moved to the top of the display area, the content of the display area will be replaced by the preceding applications and/or files in the list.

Figure 10:
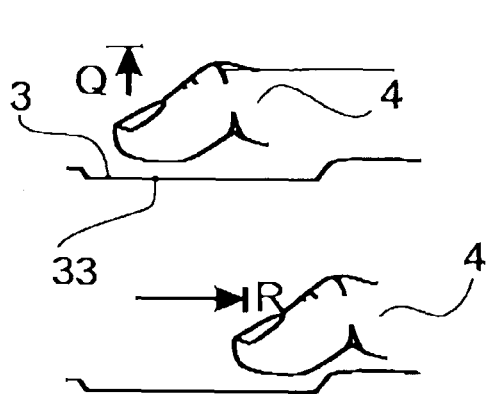
FIG. 10 is a schematic side view further illustrating how navigation is performed.

FIG. 10 shows that if the object 4 is removed Q from a first position 33 on the display area 3 and then replaced R, S on a second position 34 on the display area 3, then the navigation can be continued T from the second position 34.

Figure 11:
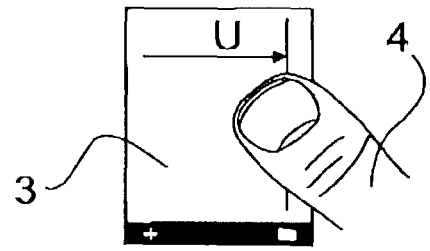
FIG. 11 is a schematic illustration of moving forwards in an application.
Figure 12:
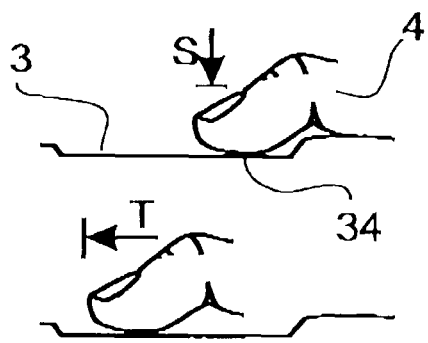
FIG. 12 is a schematic illustration of moving backwards in, or closing, an application.

FIG. 11 shows that moving U the object 4 from the left of the display area 3 to the right of the display area 3 moves the active application, function, service or setting on one step forwards. FIG. 12 shows that, in a similar manner, the active application, function, service or setting is closed or backed one step by moving V the object 4 from the right of the display area 3 to the left of the display area 3.

As shown in FIG. 1, the menu area 2 is positioned at the bottom of the touch sensitive area 1. The representation of the first function 21 is positioned at the left side of the menu area 2, the representation of the second function 22 is positioned at the middle of the menu area 2, and the representation of the third function 23 is positioned at the right side of the menu area 2.

Figure 13:
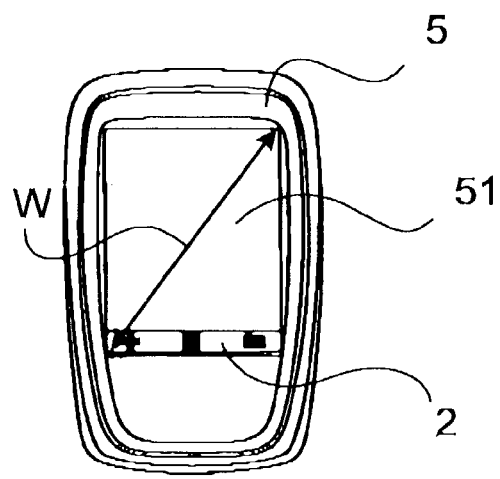
FIG. 13 is a schematic illustration of an enclosure.

As shown in FIG. 13, the present invention relates to a user interface for a hand held mobile unit that preferably can be manageable with one hand. Hence the present invention teaches that the user interface is adapted to a touch sensitive area 1 with a size that is in the order of 2-3 inches, meaning the diagonal distance W between two corners of the touch sensitive area 1.

The user interface is adapted to be operated by one hand, where the object 4 can be a finger, such as the thumb shown in the figures, of a user of the computer unit. It should be understood though that the present invention might also be used with another object, such as a pen or other pointing device.

According to one preferred embodiment of the present invention the computer unit is covered with an enclosure 5, which is provided with an opening 51 for the display area 3, and where the representations of the menu area 2 are printed on top of the enclosure 5. It should be understood that the opening 51 might be a transparent part of the enclosure 5 or that it might be an open aperture depending on among other things technical considerations pertaining to the touch sensitive area 1.

This makes it possible to allow the enclosure 5 to be removable and exchangeable.

Figure 14:
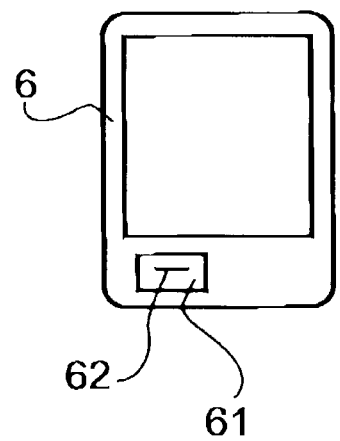
FIG. 14 shows a computer readable medium in the form of a solid state memory.

FIG. 14 shows a computer readable medium, in the figure schematically shown as a solid-state memory 61. A computer program product is stored within the computer readable medium. This computer program product comprises computer readable code 62, which, when read by a computer 6, will make it possible for the computer 6 to present a user interface according to the present invention.

The present invention also teaches that the computer program product is adapted to function as a shell upon an operating system.

It will be understood that the invention is not restricted to the aforedescribed and illustrated exemplifying embodiments thereof, and that these embodiments can be modified within the scope of the inventive concept illustrated in the accompanying Claims.

The invention claimed is:
1. A non-transitory computer readable medium storing instructions which, when executed by a processor of an electronic device having a touch-sensitive display, cause the processor to provide a user interface of the device, comprising:

presenting a list of items on the display, each item having content associated therewith and each item being thinner than a typical human fingertip;

marking an item in the list;

in response to gliding an object in a glide gesture along the display in a direction upwards or downwards, shifting the marking from successive item to item within the list in the direction of the glide wherein the gliding object touches the display at locations that are ahead of the marking in the direction of the glide; and in response to a tap gesture performed on the display by the object at the location at which the glide gesture is stopped, opening the content associated with the currently marked item.

2. The computer readable medium of claim 1, wherein the user interface further responds to gliding the object twice as follows:

in response to gliding the object in a first glide gesture along the display in a specific direction, shifting the marking from successive item to item in the list in the specific direction; and in response to gliding the object in a second glide gesture along the display in the specific direction, continuing shifting the marking from successive item to item in the list in the specific direction, wherein the object is lifted from the display after the first glide gesture and replaced at a different location on the display prior to the second glide gesture.

3. The computer readable medium of claim 2, wherein the number of items in the list exceeds the number of items that can fit on the display, and when the marking reaches the end of the display but is not at an end of the list, then the marking remains fixed and additional items in the list are shifted into the display at the side where the marking is located and, as each item is shifted into the display an item at the opposite side of the display is shifted out of the display, during at least one of the first and second glide gestures.

4. The computer readable medium of claim 1, wherein a speed of said shifting the marking is slower than a speed of the object gliding.

5. The computer readable medium of claim 1, wherein the content associated with the items are applications.

6. The computer readable medium of claim 1, wherein the content associated with the items are files.

7. The computer readable medium of claim 1, wherein the content associated with the items are contacts in a contact list.

8. The computer readable medium of claim 1, wherein the content associated with the items are email messages in a mailbox.

9. The computer readable medium of claim 1, wherein the content associated with the items are calls in a telephone log.

10. The computer readable medium of claim 1, wherein the user interface opens content associated with the currently marked item within an application associated with the content, in response to the tap gesture.

11. The computer readable medium of claim 1, wherein the marking comprises a frame around the selected item.

12. The computer readable medium of claim 1, wherein the marking comprises an inversion of the presentation of the selected item.

13. The computer readable medium of claim 1, wherein the list is configured to present different types of items, and wherein the user interface changes the type of items presented in the list, in response to tapping on a specific control in the display.

14. The computer readable medium of claim 1, wherein the user interface closes the content associated with an item, in response to gliding the object in a glide gesture while the content is open.

15. The computer readable medium of claim 1, wherein the user interface advances content associated with an item by a single step, in response to gliding the object in a glide gesture while the content is open.

16. The computer readable medium of claim 1, wherein the user interface enables editing the currently marked item without opening the content associated with the currently marked item.

17. The computer readable medium of claim 16, wherein the user interface enables editing the currently marked item via a virtual keypad.

18. The computer readable medium of claim 17, wherein the user interface opens the virtual keypad in response to a glide gesture.

19. The computer readable medium of claim 1, wherein the glide gesture glides the object along the display over a portion of the list.

* * * * *